United States Patent
Sato et al.

(10) Patent No.: US 8,613,450 B2
(45) Date of Patent: Dec. 24, 2013

(54) PIPE CONNECTING MECHANISM FOR SEAL DEVICE AND MECHANICAL SEAL DEVICE

(75) Inventors: Tetsuya Sato, Tokyo (JP); Yoichi Ogata, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 48 days.

(21) Appl. No.: 13/517,379

(22) PCT Filed: Mar. 7, 2011

(86) PCT No.: PCT/JP2011/055252
§ 371 (c)(1),
(2), (4) Date: Jun. 20, 2012

(87) PCT Pub. No.: WO2011/122256
PCT Pub. Date: Oct. 6, 2011

(65) Prior Publication Data
US 2012/0267860 A1    Oct. 25, 2012

(30) Foreign Application Priority Data
Mar. 31, 2010    (JP) .................................. 2010-083385

(51) Int. Cl.
*F16J 15/34*    (2006.01)

(52) U.S. Cl.
USPC .......................... 277/401; 277/358; 277/408

(58) Field of Classification Search
USPC ................... 277/358, 370, 371, 377
See application file for complete search history.

(56) References Cited

U.S. PATENT DOCUMENTS

| | | | |
|---|---|---|---|
| 2,971,784 A * | 2/1961 | Tracy | 277/360 |
| 3,015,506 A * | 1/1962 | Tracy | 277/388 |
| 3,589,738 A * | 6/1971 | Tracy | 277/397 |
| 3,788,653 A * | 1/1974 | Sigmon | 277/368 |
| 4,196,911 A * | 4/1980 | Matsushita | 277/401 |
| 7,726,659 B2 * | 6/2010 | Fujiwara et al. | 277/387 |
| 2004/0026871 A1 * | 2/2004 | Stephens et al. | 277/401 |

FOREIGN PATENT DOCUMENTS

| | | |
|---|---|---|
| JP | 51-29678 Y2 | 7/1976 |
| JP | 63-74586 U | 5/1988 |

(Continued)

OTHER PUBLICATIONS

International Search Report (in Japanese with English translation) for PCT/JP2011/055252, mailed Apr. 5, 2011; ISA/JP.

(Continued)

*Primary Examiner* — Gilbert Lee
(74) *Attorney, Agent, or Firm* — Harness, Dickey & Pierce, PLC

(57) ABSTRACT

Disclosed is a completely nonmetallic pipe connection mechanism for a seal device. In the pipe connecting mechanism of the present invention, a metallic reinforcing pipe (60) is screwed in a through-bore (53) of a flange (50), and a resin connecting pipe (70) is inserted into a through-bore (67) and an expanding diameter portion (68) of the metallic reinforcing pipe (60). Also, a metallic cap (80) is installed in a head (63) of the metallic reinforcing pipe (60), and a large diameter portion (74) of the resin connecting pipe (70) is sandwiched between the metallic reinforcing pipe (60) and the metallic cap (80). Also, a tapered male screw (96) of a resin connector (90) is screwed in a tapered female screw (76) of the large diameter portion (74) of the resin connecting pipe (70) to connect a tube (98) with the resin connecting pipe (70). The tip portion of the resin connecting pipe (70) is provided with an O-ring (72), which is arranged on an expanding diameter portion (16) of the stationary ring (10) to seal between an outer circumference surface of the resin connecting pipe (70) and an inner circumference surface of the expanding diameter portion (16).

5 Claims, 3 Drawing Sheets

(56) References Cited

FOREIGN PATENT DOCUMENTS

| | | |
|---|---|---|
| JP | 2008-82354 A | 4/2008 |
| JP | 2009-138867 A | 6/2009 |

OTHER PUBLICATIONS

International Preliminary Report on Patentability and Written Opinion of the International Searching Authority (with English Translation) issued on Nov. 13, 2012.

\* cited by examiner

PIPE CONNECTING MECHANISM FOR SEAL DEVICE AND MECHANICAL SEAL DEVICE

CROSS-REFERENCE TO RELATED APPLICATIONS

This application is a 371 U.S. National Stage of International Application No. PCT/JP2011/055252, filed on Mar. 7, 2011, and claims priority to Japanese Patent Application No. 2010-083385, filed on Mar. 31, 2010, the disclosures of which are herein incorporated by reference in their entirety.

TECHNICAL FIELD

The present invention relates to a pipe connecting mechanism for a seal device and a mechanical seal device using the pipe connecting mechanism.

BACKGROUND ART

In a mechanical seal device installed in a common device such as pump and agitation apparatus, a pipe for drain or flushing and the like is often connected by screwing in a bore (opening) for piping, formed on a flange portion formed in a metallic member such as seal case (for example, Japanese Unexamined Patent Publication No. 2009-138867 (Patent Document 1) and Japanese Unexamined Patent Publication No. 2008-82354 (Patent Document 2)). In this configuration, metal is exposed in an inside space both in a bore penetrating portion where the bore is formed on the metallic flange portion and a pipe connecting portion via the flange portion.

On the other hand, in a device such as pump and agitation apparatus, high corrosion resistance may be required for the inside space and a specification in which metal is not exposed (nonmetallic specification) may be required, for characteristics of a processing object and the like. In these cases, same specifications are also required in a mechanical seal device to be installed.

Therefore, for example, the flange portion is formed by high corrosion resistant metal such as HASTELLOY® material (HASTELLOY is registered trademark of Haynes International Inc in US), titanium material and the like in a mechanical seal device for a device in which corrosion resistance is particularly required, such as glass lining pump and glass lining agitation apparatus.

Also, when high corrosion resistant metal is too expensive to use in terms of cost or when there remain problems in corrosion resistance even with high corrosion resistant metal, metallic flange portion surface (metal-exposed face) may be subjected to lining application with resin, such as PTFE (polytetrafluoroethylene), PFA (perfluoroalkoxy resin, perfluoroalkoxy alkane) and PEEK (polyetheretherketone).

[Patent Document 1] Japanese Unexamined Patent Publication No. 2009-138867
[Patent Document 2] Japanese Unexamined Patent Publication No. 2008-82354

DISCLOSURE OF INVENTION

Problems to be Solved by the Invention

However, even high corrosion resistant metal may not be usable for example in a device used in an atmosphere where elution of metal ions has to be avoided, such as pump and agitation apparatus for a substance used in a semiconductor product, food or drug.

Also, in the pipe connecting portion where the metal surface is subjected to lining application with resin such as PTFE, PFA or PEEK, when a pipe is screw in a bore for piping in a flange portion to connect, a problem such that the lining is removed may be caused by screw-in. In addition, when the metal surface is lined, there may be another problem such that the pipe itself is increased in size in the constitution where the pipe is connected to the flange portion, resulting in increase in size of constitution of the seal device to make the whole device larger.

Also, when the bore penetrating portion (opening portion) of the flange portion is lined by resin such as PTFE, PFA and PEEK, such lining may be easily removed at a corner, for example. When the corner is subjected to round chamfering in order to solve the problem, components may grow in size to increase the size of the device in whole.

In addition, the pipe itself of the flange portion may be made of resin such as PTFE, PFA and PEEK, but resin-made pipe may creep due to inside temperature, pressure and the like to easily cause leakage from the screw-in portion.

The present invention has been made in view of these problems, and the purpose is to provide a pipe connecting mechanism for a seal device, able to connect the desired space in a mechanical seal device with external pipe without exposing metal to the inside.

Also, another purpose of the present invention is to provide a mechanical seal device without exposing metal to the inside in the pipe connecting mechanism, preferably used when high corrosion resistance is required, or preferably used in a device for semiconductor product, food or drug, for example, in which specification not to expose metal (nonmetallic specification) is required.

Means for Solving the Problems

To solve the above problems, a pipe connecting mechanism for a seal device of the present invention according to claim 1 is a pipe connecting mechanism for a seal device for connecting a space inside the seal device with an external pipe, comprising a communicating bore formed in a nonmetallic member constituting the seal device and communicated with the space to be connected at one of end portions thereof; a resin connecting pipe inserted into the other end portion of the communicating bore at one of end portions thereof; a reinforcing member having a through-bore into which the connecting pipe is inserted and which is connected with the other end portion of the communicating bore at one of end portions thereof, the reinforcing member being fixedly mounted to the predetermined member of the seal device; a resin connector connected with the other end portion of the connecting pipe inserted into the reinforcing member at one of end portions thereof and connected with the external pipe at the other end portion thereof; and a packing fixedly set up on an end portion of the connecting pipe inserted into the other end portion of the communicating bore and sealing between an outer circumference surface of an end portion of the connecting pipe and an inner circumference surface of the other end portion of the communicating bore.

According to the pipe connecting mechanism for a seal device of the present invention according to claim 1, the resin connecting pipe is inserted into the reinforcing member while one of its end portions is inserted into the other end portion of the communicating bore formed on the nonmetallic member, the outer circumference surface of the connecting pipe and the inner circumference surface of the communicating bore are sealed by the rubber packing, and further, the other end portion of the connecting pipe and the external pipe are connected by the resin connector, so that it is possible to prevent from exposing metal to the inside for an entire pathway from the communicating bore to the external pipe.

Also, in the pipe connecting mechanism for a seal device of the present invention according to claim 2, the connecting pipe has a large diameter portion formed on the other end portion and a tapered female screw formed inside the large diameter portion; the reinforcing member has an expanding diameter portion for housing the large diameter portion of the connecting pipe at the other end portion thereof; the pipe connecting mechanism further has a metallic cap installed in the other end portion of the reinforcing member when the large diameter portion is housed in the expanding diameter portion and sandwiching the large diameter portion; and the connector has a tapered male screw at the end portion and is connected by screwing in the tapered female screw on the other end portion of the connecting pipe via an opening formed on an end face of the cap.

Also, according to the pipe connecting mechanism for a seal device of the present invention according to claim 2, since the large diameter portion at the other end side of the connecting pipe is sandwiched between the metallic reinforcing member and the metallic cap, it is possible to decrease influences due to inside temperature or pressure and to reduce deformation of an end portion of the connecting pipe. Also, since the connector is connected by the tapered female screw and the tapered male screw, the connecting portion can be reduced in size to downsize the device.

Also, in the pipe connecting mechanism for a seal device of the present invention according to claim 3, the communicating bore is formed in a sliding material of the seal device.

Also, according to the pipe connecting mechanism for a seal device of the present invention according to claim 3, since the communicating bore is provided on the nonmetallic sliding material, it is possible to properly form a pipe pathway even in a space right next to sealing surfaces.

Also, in the pipe connecting mechanism for a seal device of the present invention according to claim 4, the reinforcing member is fitted in a through-bore formed on a metallic flange of a seal case and fixedly mounted.

Also, according to the pipe connecting mechanism for a seal device of the present invention according to claim 4, the reinforcing member is fixedly mounted on the metallic flange, so that it is possible to properly reinforce the connecting pipe and to stably arrange the pipe.

Also, the mechanical seal device of the present invention according to claim 5 has any one of the above pipe connecting mechanisms for a seal device.

Also, according to the mechanical seal device of the present invention according to claim 5, it is possible to provide a mechanical seal device without exposing metal to the inside in the pipe connecting mechanism, preferably used when high corrosion resistance is required, or preferably used in a device for semiconductor product, food or drug, for example, in which specification not to expose metal (nonmetallic specification) is required.

BEST MODE FOR CARRYING OUT THE INVENTION

An embodiment of the present invention will be explained in reference to FIG. 1 to FIG. 3.

In the present embodiment, for example, the present invention will be explained by taking the following vertical mechanical seal device as an example: the mechanical seal device provided with a pipe connecting mechanism for a seal device according to the present invention installed in a device such as pump and agitation apparatus for drug, food and the like, the mechanical seal device sealing between an inner circumference surface of an opening of a casing (container) and an outer circumference surface of a rotary shaft fixedly set up in vertical direction to penetrate the casing at its top.

Figure 1:
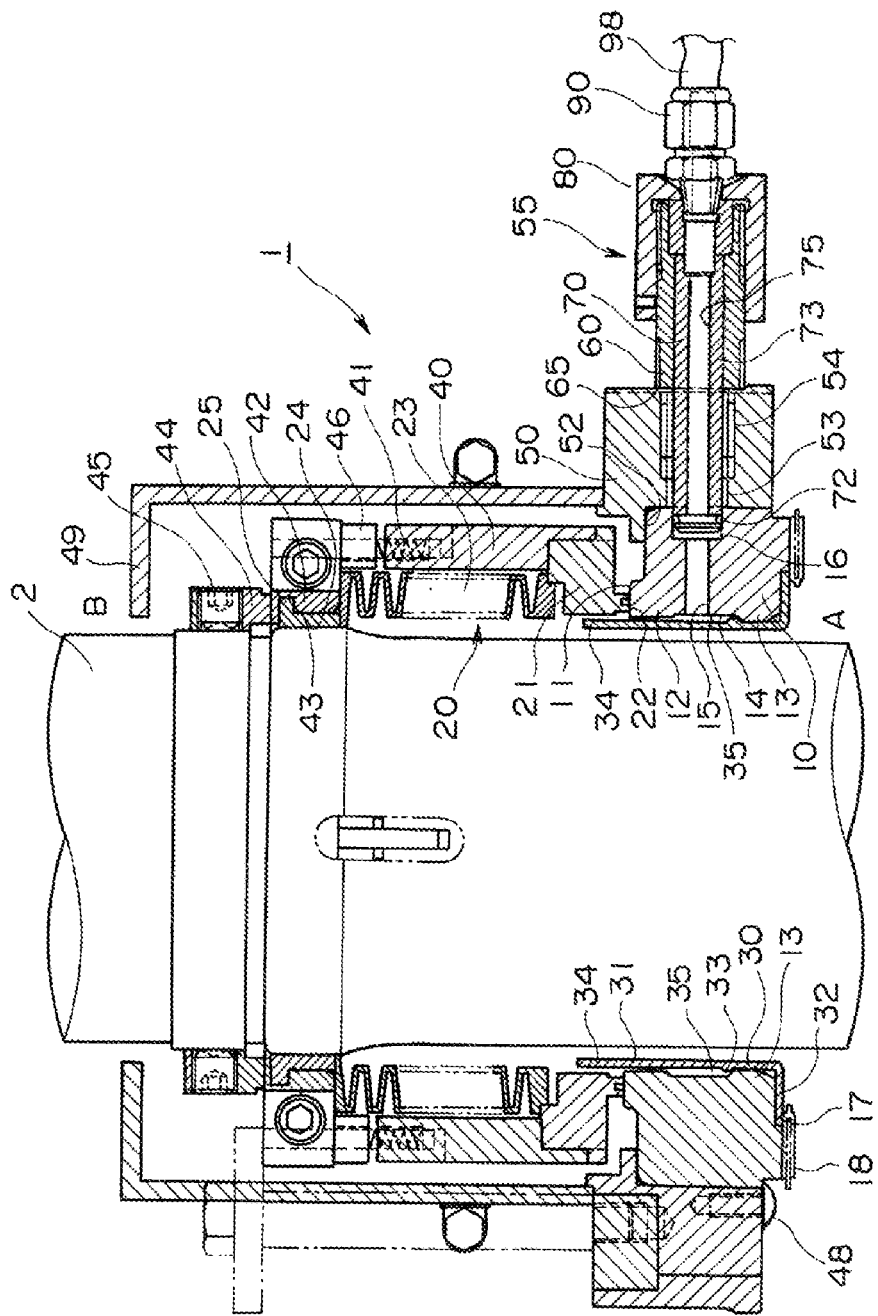
FIG. 1 shows a structure of a mechanical seal device of an embodiment of the present invention.

FIG. 1 is a cross-sectional view showing the structure of the mechanical seal device 1.

A rotary shaft 2 in FIG. 1 is fixedly set up in the vertically elongated direction so as to make vertical direction to be axial direction, and its upper end portion passes through an upper opening of a casing (not shown in the figure), projects to an outside space (air space) B and is connected to, for example, a rotary drive device such as motor. The rotary shaft 2 is supported by a bearing (not shown in the figure), and sealed by the mechanical seal device 1 with respect to the opening of the casing, by which the device is separated into an inside space A and the outside space (air space) B.

The mechanical seal device 1 has a stationary ring (mating ring) 10 and a rotary ring 21 as shown in the figure. Also, a seal surface 11 formed on the top surface of the stationary ring 10 and a seal surface 22 formed on the lower surface of the rotary ring 21 are in closely contact with each other to slide, causing to seal between the casing and the rotary shaft 2, i.e. between the inside space A and the outside space B. In the present embodiment, materials of the stationary ring 10 are nonmetallic materials such as silicon carbide, ceramic and carbon. Also, material of the rotary ring 21 is PTFE (polytetrafluoroethylene) containing filler.

The stationary ring 10 is fixedly mounted to the opening of the casing (not shown in the figure) via a metallic flange 50. The stationary ring 10 is fitly inserted to an annular concave portion 52 formed on an inner circumference surface at the inside of the flange 50, and integrally fixed to the flange 50 by fixing a plurality of places on an outer circumference surface at the inside by screws 48.

On an inner circumference surface of the stationary ring 10, an outside convex portion 12 and an inside convex portion 13 are formed, in which an outside edge and an inside edge are respectively formed with the predetermined width on an inner side of radial direction convexly (i.e. to have a small diameter). The height of the inside convex portion 13 is approximately same as the height of an engaging convex portion 33 of the after-mentioned foreign matter receiving device 30, and due to engagement of the engaging convex portion 33 of the foreign matter receiving device 30 to the inside convex portion 13, the foreign matter receiving device 30 is installed in and held by the inner circumference surface of the stationary ring 10.

Also, a concave portion 14 is formed between the outside convex portion 12 and the inside convex portion 13 on the inner circumference surface of the stationary ring 10. Further, one or a plurality of drain bore(s) (communicating bore(s)) 15 is formed along circumferential direction to the concave portion 14, which penetrates from the inner circumference surface to the outer circumference surface in radial direction and has a circular cross-section. Also, an end portion on outer circumference side of the drain bore 15 is formed into an expanding diameter portion 16 in which its cross-section is increased in diameter at the predetermined depth (radial direction length).

With respect to the drain bore 15 of the stationary ring 10, one or a plurality of through-bore(s) 53 is formed along circumferential direction on the flange 50, i.e. on an axis same as the drain bore 15 of the stationary ring 10, which penetrates from the inner circumference surface to the outer circumference surface in radial direction and has a circular cross-section. A screw 54 is formed on the outer circumference surface except for a partial portion on inner circumference side of the through-bore 53.

A drain pipe portion 55 is connected to the drain bore 15 of the stationary ring 10, the expanding diameter portion 16 and the through-bore 53 of the flange 50, and foreign matter and the like or lubricant oil and the like (when the mechanical seal device 1 uses lubricant oil), housed in the foreign matter receiving portion 35 formed between the outer circumference surface of the foreign matter receiving device 30 and the inner circumference surface of the stationary ring 10, are discharged from the drain bore 15 to the outside via the drain pipe portion 55.

Note that the constitutions of the foreign matter receiving device 30 and the drain pipe portion 55 will be explained later in detail.

The rotary ring 21 is, as in the figure, integrated with a bellows 23 and an insert portion 24 to form a cylindrical rotary ring portion 20. The rotary ring portion 20 is fixed to the rotary shaft 2 so as to integrally rotate with the rotary shaft 2 by fitting the insert portion 24 on its upper end portion to the rotary shaft 2 and fixedly setting up a clamping ring 42 on its outer circumference side to squeeze. An engaging convex portion 25 is formed on an upper end portion of the insert portion 24, which annularly projects to radial direction outside of the rotary shaft 2. Due to engagement of this to an engaging groove portion 43 formed on an inner circumference surface of the clamping ring 42, the rotary ring portion 20 and the clamping ring 42 are integrated so as not to misalign relatively in axial direction, and both are fixed to the rotary shaft 2. Also, a collar 44 fixed to the rotary shaft 2 by a set screw 45 is fixedly set up on top of the rotary ring portion 20 and clamping ring 42 placed on the rotary shaft 2, and latches together the rotary ring portion 20 and the like not to move to upper side of axial direction.

The rotary ring 21 is connected via the insert portion 24 and the bellows 23 fixed to the rotary shaft 2 as mentioned above, and is made movable in axial direction of the rotary shaft 2 along with expansion and contraction of the bellows 23.

On a plurality of the predetermined outer places of the rotary ring 21, a coil spring 41 is connected. One end portion of the coil spring 41 is fixed to the clamping ring 42 via a spring adapter 46, and the other end portion is connected to an outer circumferential edge of the rotary ring 21 via a spring receiving portion 40. The rotary ring 21 is biased by the coil spring 41 to stationary ring 10 direction, so that the seal surface 22 of the rotary ring 21 are made close contact with the seal surface 11 of the stationary ring 10 at a proper surface pressure.

Note that sliding surface of the seal surface 22 of the rotary ring 21 and the seal surface 11 of the stationary ring 10 may be constituted in dry seal in which seal surfaces are closely slid under dry condition without lubricant oil and the like, or may be constituted such that seal surfaces are closely slid in the presence of lubricant oil.

Also, in the mechanical seal device 1, a seal cover 49 is installed on outside space B side of the flange 50 to cover the whole rotary ring portion 20 including the rotary ring 21, bellows 23, insert portion 24 and coil spring 41.

The foreign matter receiving device 30 is placed on the inner circumference surface at the inside of the mechanical seal device 1.

The detailed structure of the foreign matter receiving device 30 will be explained in reference to FIGS. 2A and 2B.

Figure 2A:
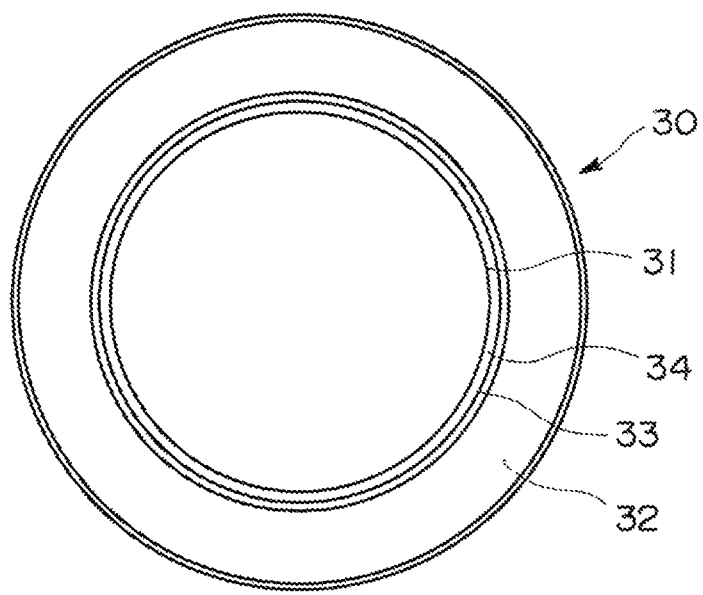
FIGS. 2A and 2B show a structure of a foreign matter receiving device of the mechanical seal device shown in FIG. 1.
Figure 2B:
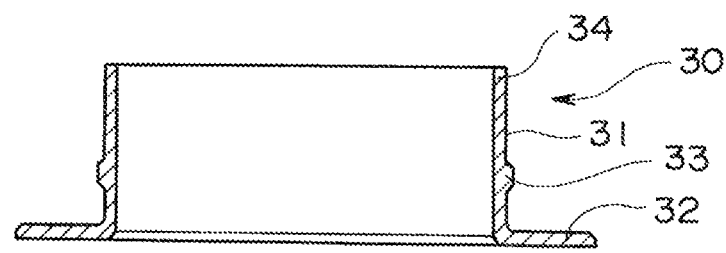

FIGS. 2A and 2B show the structure of the foreign matter receiving device 30, and FIGS. 2A and 2B are a plane view and a cross-sectional view, respectively.

As shown in FIGS. 2A and 2B, the foreign matter receiving device 30 is an annular member having a L-shaped cross-section, and has a roll portion 31 concentrically placed around the rotary shaft 2, an annular shaped lower guard portion (flange portion) 32 projecting to outside in radial direction from an inside end portion of the mechanical seal device 1, and the engaging convex portion 33 projecting to outside in radial direction with the predetermined height from the outer circumference surface on the way in axial direction of the roll portion 31.

Materials of the foreign matter receiving device 30 are resin.

As mentioned before, the inside convex portion 13 is formed on the inside edge of the inner circumference surface of the stationary ring 10 where the foreign matter receiving device 30 is installed, and by inserting the foreign matter receiving device 30 to an inner circumference portion of the stationary ring 10 from the inside at the predetermined pressure, the foreign matter receiving device 30 is installed into the stationary ring 10 as in FIG. 1. Namely, the engaging convex portion 33 of the foreign matter receiving device 30 is placed on the outside concave portion 14 over the inside convex portion 13 of the stationary ring 10.

In this condition, the engaging convex portion 33 of the foreign matter receiving device 30 and the inside convex portion 13 of the stationary ring 10 are sufficiently engaged, so that the foreign matter receiving device 30 hardly comes away from the inner circumference portion of the stationary ring 10 unless considerable force is applied thereto. Therefore, the foreign matter receiving device 30 can be placed stably on the inner circumference portion on the inside of the stationary ring 10 without using any fixation member such as bolt.

When the foreign matter receiving device 30 is thus installed in the stationary ring 10, an upper end portion 34 of the roll portion 31 of the foreign matter receiving device 30 is placed at a position, higher than the closely sliding surface between the seal surface 11 of the stationary ring 10 and the seal surface 22 of the rotary ring portion 20, as shown in FIG. 1. In other words, the length and the like of the roll portion 31 of the foreign matter receiving device 30 are set to attain such an arrangement. Because of such constitution, even when foreign matters such as abrasion powder are caused by close sliding between the seal surface 11 of the stationary ring 10 and the seal surface 22 of the rotary ring portion 20, or even when the lubricant oil and the like used in the sliding seal surfaces are leaked, the resultant foreign matters or leaked oil, etc. can be fallen and housed in the foreign matter receiving portion 35 which is a gap between the outer circumference side of the roll portion 31 of the foreign matter receiving device 30 and the inner circumference surface of the stationary ring 10. Therefore, it is possible to prevent these foreign matters, lubricant oil and the like from entering the inside space A.

Also, a step portion 17 is formed on an inside end surface of the stationary ring 10, whose inner circumference side is annular concave-shaped with the predetermined width. The guard portion 32 of the foreign matter receiving device 30 is housed in the step portion 17 when the foreign matter receiving device 30 is installed in the inner circumference surface of the stationary ring 10 as mentioned above.

Then, a gasket 18 is placed on further inside end surface of the stationary ring 10 where the foreign matter receiving device 30 is installed. The gasket 18 is placed in the stationary ring 10 to make its inner circumference portion be arranged on further internal diameter side than the position of the step portion 17 of the stationary ring 10, i.e. on further internal diameter side than an outer circumferential portion of the guard portion 32 of the foreign matter receiving device 30. In other words, shapes of the step portion 17 of the stationary ring 10 and the guard portion 32 of the foreign matter receiving device 30 are set to attain such a positional relation to the inner circumference portion of the gasket 18.

Because of such constitution, the foreign matter receiving device 30 cannot drop from the stationary ring 10, so that it is possible to completely prevent the foreign matter receiving device 30 from falling in the inside space A.

As mentioned before, lubricant oil, foreign matters and the like housed in the foreign matter receiving portion 35 of the foreign matter receiving device 30 are discharged to the outside via the drain pipe portion 55.

The structure of the drain pipe portion 55 will be explained in detail in reference to FIG. 3 in addition to FIG. 1.

Figure 3:
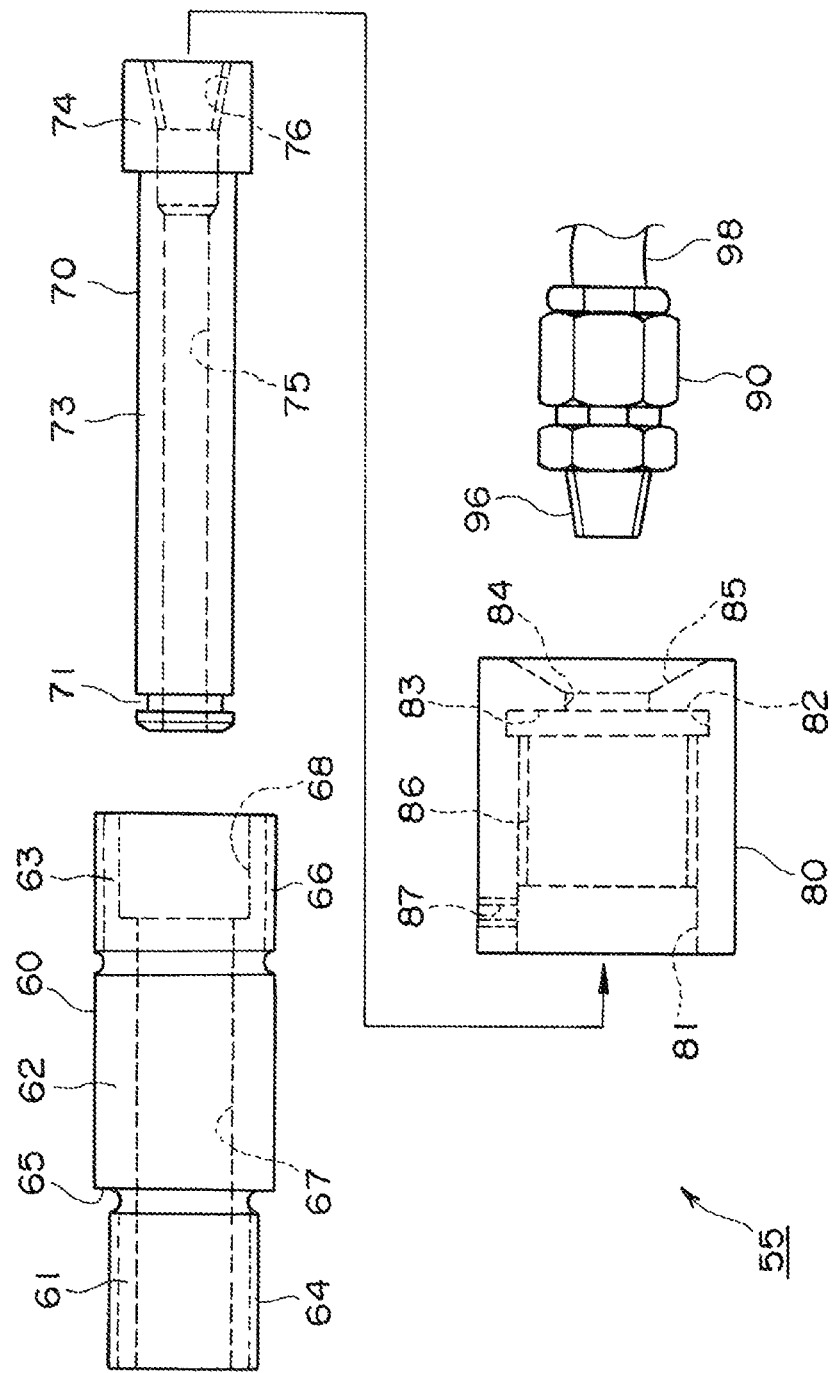
FIG. 3 is an exploded view showing a structure of a drain pipe of the mechanical seal device shown in FIG. 1.

FIG. 3 is an exploded view for explaining the structure of the drain pipe portion 55.

As shown in FIG. 3, the drain pipe portion 55 has a metallic reinforcing pipe (reinforcing member) 60, a resin connecting pipe 70, a metallic cap 80 and a resin connector 90, and is installed in the expanding diameter portion 16 of the stationary ring 10 and the through-bore 53 of the flange 50 by integrally assembling these components, as shown in FIG. 1.

The metallic reinforcing pipe 60 is a roll-shaped member for reinforcing the resin connecting pipe 70 in FIG. 3. A through-bore 67 penetrating in axial direction is formed inside the metallic reinforcing pipe 60, where a fuselage portion 73 of the resin connecting pipe 70 is inserted, held and reinforced. An internal diameter of the through-bore 67 is formed to be approximately same as an outer diameter of the fuselage portion 73 of the resin connecting pipe 70.

The metallic reinforcing pipe 60 has a flange insert portion 61, an intermediate fuselage portion 62 and a head 63.

The flange insert portion 61 is a member to be inserted in the through-bore 53 of the flange 50 (FIG. 1), and its outer circumferential portion is formed into a male screw 64 corresponding to a female screw 54 formed on the through-bore 53 of the flange 50. By screwing the flange insert portion 61 into the through-bore 53 of the flange 50, the metallic reinforcing pipe 60 is firmly placed in the flange 50.

The intermediate fuselage portion 62 is an intermediate member larger in diameter than the flange insert portion 61. An end surface 65 on a flange insert portion 61 side of the intermediate fuselage portion 62 can abut against an outside lateral face of the flange insert portion 61 when the flange insert portion 61 is screwed in the through-bore 53 of the flange 50 (FIG. 1), by which a position for screwing the metallic reinforcing pipe 60 in the flange 50, i.e. installation position, is determined.

The head 63 is a member for holding a large diameter portion 74 of the resin connecting pipe 70 with respect to the metallic cap 80 externally installed. An outer circumferential portion of the head 63 is formed into a male screw 66, into which the metallic cap 80 formed into a hexagon cap nut form is installed. The through-bore 67 penetrating the metallic reinforcing pipe 60 is formed into an expanding diameter portion 68 whose internal diameter is expanded inside the head 63, and when the resin connecting pipe 70 is fitly inserted into the metallic reinforcing pipe 60, a large diameter portion 74 of an outer (distal side from the rotary shaft 2) end portion of the resin connecting pipe 70 is fitly inserted into the expanding diameter portion 68. The height of the large diameter portion 74 of the resin connecting pipe 70 (axial-direction length of the resin connecting pipe 70) is slightly longer than the depth of the expanding diameter portion 68 of the metallic reinforcing pipe 60 (axial-direction length of the metallic reinforcing pipe 60), and even when the large diameter portion 74 of the resin connecting pipe 70 is inserted to the bottom surface of the expanding diameter portion 68, the outer end portion slightly projects to the outside from an end edge of the expanding diameter portion 68. Namely, the large diameter portion 74 of the resin connecting pipe 70 is placed in so-called inrou setting (inrou setting is a condition that the boundary surfaces of two members engaged by inserting a convex portion of one member to a concave portion of another member, become flat as a stamp case) with respect to the expanding diameter portion 68 of the metallic reinforcing pipe 60. By installing the metallic cap 80 to the head 63 of the metallic reinforcing pipe 60 in which the resin connecting pipe 70 is thus inserted, the large diameter portion 74 of the resin connecting pipe 70 is sandwiched between the head 63 of the metallic reinforcing pipe 60 and the metallic cap 80.

The resin connecting pipe 70 connects the drain bore 15 of the stationary ring 10 to a tube (external pipe) 98 connected to the after-mentioned resin connector 90 (FIG. 1) and is used for passing through and discharging lubricant oil, foreign matters and the like.

The resin connecting pipe 70 is, as mentioned before, reinforced and used by being inserted by the metallic reinforcing pipe 60.

The resin connecting pipe 70 has the fuselage portion 73 and the large diameter portion 74.

The fuselage portion 73 is a part which is inserted into the through-bore 67 of the metallic reinforcing pipe 60. An O-ring mounting groove 71 is formed on a tip portion of the fuselage portion 73, to which an O-ring (packing) 72 (FIG. 1) made of fluorine-containing rubber such as FKM or Kalrez ("Kalrez" is registered trademark of DuPont Performance Elastomers LLC in US) is fitted.

The large diameter portion 74 is a part which is inserted into the expanding diameter portion 68 of the metallic reinforcing pipe 60. As mentioned before, by inserting the large diameter portion 74 into the expanding diameter portion 68 and installing the metallic cap 80 in the metallic reinforcing pipe 60, the resin connecting pipe 70 is held by the metallic reinforcing pipe 60.

A tapered female screw 76 is formed inside the large diameter portion 74. The tapered female screw 76 is a screw bore into which a tapered male screw 96 formed inside the resin connector 90 (radial-direction inside of the rotary shaft 2) is screwed when the resin connector 90 is connected to the resin connecting pipe 70.

Note that the resin connecting pipe 70 is made of PTFE resin mixed with fiberglass or carbon graphite which is excellent in strength, or engineering plastic such as PEEK material. Therefore the tapered female screw 76 is formed by base material of resin pipe.

In thus-formed resin connecting pipe 70, the tip portion including the part where the O-ring 72 of the resin connecting pipe 70 is installed is fixedly set up on the expanding diameter portion 16 of the stationary ring 10 as shown in FIG. 1 when the resin connecting pipe 70 is installed in the metallic reinforcing pipe 60 and the metallic reinforcing pipe 60 is placed by screwing in the through-bore 53 of the flange 50 as mentioned before. In other words, the length of the fuselage portion 73 of the resin connecting pipe 70 is determined so as to fixedly set up in this way.

In the expanding diameter portion 16 of the stationary ring 10, the O-ring 72 seals between an outer circumference surface of the fuselage portion 73 of the resin connecting pipe 70 and an inner circumference surface of the expanding diameter portion 16 of the stationary ring 10. This allows directly connecting an end portion of the through-bore 75 of the resin connecting pipe 70 to the stationary ring 10, so that any surface of the flange 50 including the inner circumference surface of the through-bore 53 is not exposed to flow passage for discharging lubricant oil, foreign matters and the like.

The metallic cap 80 is a member in hexagon cap nut form which is installed in the head 63 of the metallic reinforcing pipe 60 and sandwiches the large diameter portion 74 of the resin connecting pipe 70 with respect to the metallic reinforcing pipe 60. Namely, as shown in FIG. 3, a cylindrical opening 81 is formed on the metallic cap 80, which is opened to inside direction (direction of radial-direction inside of the rotary shaft 2, and direction of a resin connecting pipe 70 side), and a female screw 86, into which the head 63 of the metallic reinforcing pipe 60 where the male screw 66 is formed is screwed, is formed on its inner circumference surface. A bottom surface 83 is formed on the bottom of the female screw 81, and an expanding diameter portion 82 having a slightly larger internal diameter is formed on the way thereto. When the metallic cap 80 is installed in the metallic reinforcing pipe 60, the bottom surface 83 abuts against an end portion on a large diameter portion 74 side of the resin connecting pipe 70, and sandwiches the large diameter portion 74 of the resin connecting pipe 70 with respect to the expanding diameter portion 68 of the metallic reinforcing pipe 60.

In the center of the bottom surface 83 of the metallic cap 80, an opening 84 is formed, which is communicated to the tapered female screw 76 of the large diameter portion 74 of the resin connecting pipe 70 and has an approximately same internal diameter as the tapered female screw 76 does. Also, a concave portion 85 is formed on the outside, which is communicated to the opening 84 and has a tapered surrounding surface. The after-mentioned tapered male screw 96 of the resin connector 90 is screwed in the tapered female screw 76 on an end portion of the resin connecting pipe 70 via the opening 84 and concave portion 85, and the resin connector 90 is installed in the resin connecting pipe 70. The opening 84 has an internal diameter for letting the tapered male screw 96 of the resin connector 90 through, and the concave portion 85 is formed into a concave form so as not to interfere with an end portion of the resin connector 90 which has a large diameter bolt form.

Also, two screw bores 87 for lateral screw are formed to be equally arranged on an end portion on a resin connecting pipe 70 side of the metallic cap 80, so as to penetrate radial-direction inside and outside of the cylindrical opening 81. When the metallic cap 80 is installed in the resin connecting pipe 70, a male screw not shown in the figures is screwed in the screw bore 87, by which the male screw is squeezed by a surrounding surface of the intermediate fuselage portion 62 of the metallic reinforcing pipe 60. Thus, the metallic reinforcing pipe 60 and the metallic cap 80 cannot be relatively rotated, so that it is possible to prevent the metallic cap 80 from loosening.

The resin connector 90 is a Swagelok male connector ("Swagelok" is registered trademark of Swagelok Company in US) in which the tapered male screw 96 is formed on one end portion on a metallic cap 80 side. A resin tube 98 connected to a suction pump and the like (not shown in the figures) is connected to the other end portion of the resin connector 90, for example. By connecting the tapered male screw 96 of the resin connector 90 to the tapered female screw 76 of the resin connecting pipe 70, the resin connector 90 is connected to the resin connecting pipe 70, and foreign matters, lubricant oil and the like housed in the foreign matter receiving portion 35 is discharged to the outside.

Note that the resin connector 90 is made of PFA. Namely, the tapered male screw 96 is formed by base material of resin pipe.

The drain pipe portion 55 has the above-described structure.

In thus-formed drain pipe portion 55, the metallic reinforcing pipe 60 is screwed in the through-bore 53 of the flange 50, and the resin connecting pipe 70 is fitly inserted into the through-bore 67 and expanding diameter portion 68 of the metallic reinforcing pipe 60. Also, the metallic cap 80 is installed in the head 63 of the metallic reinforcing pipe 60; the large diameter portion 74 of the resin connecting pipe 70 is sandwiched by the metallic reinforcing pipe 60 and the metallic cap 80; the tapered male screw 96 of the resin connector 90 is screwed in the tapered female screw 76 of the large diameter portion 74 of the resin connecting pipe 70; and the tube 98 is connected to the resin connecting pipe 70. At this time, the tip portion of the resin connecting pipe 70 penetrates the end portion of the metallic reinforcing pipe 60 and the through-bore 53 of the flange 50, and projects to the expanding diameter portion 16 of the stationary ring 10, and the O-ring 72 is arranged on the expanding diameter portion 16 to hermetically seal the outer circumference surface of the fuselage portion 73 and the inner circumference surface of the expanding diameter portion 16.

By the drain pipe portion 55 having the above constitution, foreign matters, lubricant oil and the like housed in the foreign matter receiving portion 35 between the inner circumference surface of the foreign matter receiving device 30 and the outer circumference surface of the stationary ring 10 are properly discharged to the outside via the drain pipe portion 55.

Particularly in the mechanical seal device 1 using such a drain pipe portion 55, the resin connecting pipe 70 is made of resin such as PTFE, and the resin connector 90 is made of PFA resin. The resin connecting pipe 70 and the resin connector 90 are connected via the tapered female screw 76 and the tapered male screw 96, which are formed by base material of resin pipe, tip end of the resin connecting pipe 70 penetrates to the expanding diameter portion 16 of the stationary ring 10 which is a nonmetallic member, and the O-ring 72 seals between the through-bore 53 of the metallic flange 50 and the resin connecting pipe 70. Therefore, the wetted part of the drain pipe portion 55 can completely be nonmetallic.

Therefore, the mechanical seal device 1 can be applied to, for example, a device used in the atmosphere where elution of metal ion must be avoided, such as pump and agitation apparatus handling substances used for semiconductor product, food or drug, etc.

Also, since the resin connecting pipe 70 is made of resin such as PTFE mixed with fiberglass or carbon graphite, it is excellent in strength and allows improving durability and reliability.

Also, the connection between the resin connecting pipe 70 and the resin connector 90 is constituted by screwing the tapered male screw 96 of the resin connector 90 into the tapered female screw 76 of the resin connecting pipe 70, so that the screw-in portion is completely made of resin. Therefore, it is possible to prevent conventional problems such as removal of lining in the screw-in portion.

Also, since a versatile Swagelok connector is used in the connection between the resin connecting pipe 70 and the resin connector 90, it is possible to reduce the mounting dimension compared to conventional pipe flange setting, so that a device using the mechanical seal device 1 can be downsized.

Also, in the drain pipe portion 55 of the mechanical seal device 1 of the present embodiment, the resin connecting pipe 70 is inserted to the metallic reinforcing pipe 60 for reinforcement, so that the screw-in portion, easily creeping due to inside temperature and pressure, can be protected to stably maintain the pipe for a long time.

Also, in the drain pipe portion 55, the large diameter portion 74 is sandwiched between the metallic reinforcing pipe 60 and the metallic cap 80 and fixed by providing the large diameter portion 74 on distal side (outer side) of the resin connecting pipe 70 and screwing the metallic cap 80 in the head 63 of the metallic reinforcing pipe 60 at a position sufficiently away from the inside space A. Therefore, the large diameter portion 74 and its sandwiched part are hardly influenced by inside temperature, and are favorable for temperature creep. As a result, it is possible to prevent the metallic cap 80 from loosening and to stably maintain the pipe for a long time.

Furthermore, the large diameter portion 74 of the resin connecting pipe 70 is placed in so-called mating dimension with respect to the expanding diameter portion 68 of the metallic reinforcing pipe 60 and the metallic cap 80 in the sandwiched part of the large diameter portion 74. Therefore, distortion and the like due to screwing of the metallic cap 80 are not caused, and it is possible to prevent deformation when installing the metallic cap 80.

Also, in the mechanical seal device 1, for installing the foreign matter receiving device 30, any fixing component such as bolt is not used, and the foreign matter receiving device 30 is simply inserted to the inner circumference side of the stationary ring 10 from the inside. Therefore, it is unnecessary to use fixing clasp, and all components constituting the mechanical seal device 1 including the foreign matter receiving device 30, the stationary ring 10 and the rotary ring portion 20 can be made nonmetallic members. As a result, even when the specification requires not to expose metal to the inside A, it is possible to provide the mechanical seal device 1, which satisfies the specification and can prevent foreign matters from interfusing.

Also, since the space (foreign matter receiving portion 35) to house foreign matters is kept to the minimum necessary, it is possible to prevent problems such that the volume of the device is increased for preparing excessively large housing space. Namely, small-sized mechanical seal device 1 can be provided.

Note that the above embodiment is described for easily understanding the present invention, and that the present invention is not limited to the embodiment. Each component disclosed in the present embodiment also includes all design variations and equivalents within the range of the present invention, and can be varied arbitrarily and preferably.

For example, in the above embodiment, the mechanical seal device where the pipe connecting mechanism for a seal device of the present invention is applied to the drain pipe portion is exemplified, but the pipe connecting mechanism for a seal device of the present invention is not limited to this example, and can be applied to any pipe placed in a seal device such as flushing pipe for a seal device.

Also, it is exemplified in the above embodiment that the drain bore 15 is formed on the stationary ring 10 as a communicating bore to be temporarily communicated with the space in the seal device, but the communicating bore is not limited to such an example, and may be formed on any non-metallic member.

Also, the reinforcing member (metallic reinforcing pipe 60) is installed in the through-bore 53 provided on the flange 50, but the reinforcing member may be placed on any member.

Also, the above-mentioned mechanical seal device 1 is a vertical mechanical seal device 1, but is not limited to this, and can be applied to any mechanical seal device.

INDUSTRIAL APPLICABILITY

The present invention can be applied to a shaft seal device of a rotary shaft for pump, agitation apparatus and the like, and is also usable for a shaft seal device in any other device. Particularly, it is preferable to apply to the vertical mechanical seal.

The invention claimed is:

1. A pipe connecting mechanism for a seal device for connecting a space inside the seal device with an external pipe, comprising:
   a communicating bore formed in a nonmetallic member constituting said seal device and communicated with said space to be connected at one of end portions thereof;
   a resin connecting pipe inserted into the other end portion of said communicating bore at one of end portions thereof;
   a reinforcing member having a through-bore into which said connecting pipe is inserted and which is connected to the other end portion of said communicating bore at one of end portions thereof, the reinforcing member fixedly mounted to the predetermined member of said seal device;
   a resin connector connected with the other end portion of said connecting pipe inserted into said reinforcing member at one of end portions thereof and connected with said external pipe at the other end portion thereof; and
   a packing fixedly set up on one of end portions of said connecting pipe inserted into the other end portion of said communicating bore and sealing between an outer circumference surface of the one of end portions of said connecting pipe and an inner circumference surface of the other end portion of said communicating bore.

2. The pipe connecting mechanism for a seal device as set forth in claim 1, wherein
   said connecting pipe has a large diameter portion formed on the other end portion thereof, and a tapered female screw formed inside said large diameter portion;
   said reinforcing member has an expanding diameter portion for housing said large diameter portion of said connecting pipe at the other end portion thereof;
   said pipe connecting mechanism further comprises a metallic cap installed in said other end portion of said reinforcing member when said large diameter portion is housed in said expanding diameter portion, the cap sandwiching said large diameter portion; and
   said connector has a tapered male screw at said one of end portions and is connected by screwing in said tapered female screw on said other end portion of said connecting pipe via an opening formed on an end surface of said cap.

3. The pipe connecting mechanism for a seal device as set forth in claim 1, wherein said communicating bore is formed in a sliding material of said seal device.

4. The pipe connecting mechanism for a seal device as set forth in claim 1, wherein said reinforcing member is fitted in a through-bore formed on a metallic flange of a seal case and fixedly mounted.

5. A mechanical seal device comprising the pipe connecting mechanism for a seal device as set forth in claim 1.

* * * * *